(12) United States Patent
Kim et al.

(10) Patent No.: US 11,138,431 B2
(45) Date of Patent: Oct. 5, 2021

(54) METHOD FOR JUDGING IN OR OUT, COMPUTER READABLE MEDIUM AND APPARATUS FOR PERFORMING THE METHOD

(71) Applicant: Foundation of Soongsil University-Industry Cooperation, Seoul (KR)

(72) Inventors: Gyeyoung Kim, Anyang-si (KR); Man Ki Kim, Seoul (KR)

(73) Assignee: Foundation of Soongsil University-Industry Cooperation, Seoul (KR)

(*) Notice: Subject to any disclaimer, the term of this patent is extended or adjusted under 35 U.S.C. 154(b) by 99 days.

(21) Appl. No.: 16/815,093

(22) Filed: Mar. 11, 2020

(65) Prior Publication Data
US 2020/0311419 A1 Oct. 1, 2020

(30) Foreign Application Priority Data

Apr. 1, 2019 (KR) .................. 10-2019-0037742
Nov. 26, 2019 (KR) .................. 10-2019-0153281

(51) Int. Cl.
*G06K 9/00* (2006.01)
*G10L 25/51* (2013.01)
(Continued)

(52) U.S. Cl.
CPC ....... *G06K 9/00624* (2013.01); *G06K 9/6215* (2013.01); *G06T 7/194* (2017.01);
(Continued)

(58) Field of Classification Search
CPC ............ G06K 9/00624; G06K 9/6215; G06K 9/6271; G06K 2009/3291; G06K 9/00724;
(Continued)

(56) References Cited

U.S. PATENT DOCUMENTS

| 5,489,886 A | 2/1996 | Wexler et al. |
| 9,240,213 B2 * | 1/2016 | Gerstlberger ........ G11B 27/322 |
| 2013/0039538 A1 | 2/2013 | Johnson et al. |

FOREIGN PATENT DOCUMENTS

| JP | 2000-068961 A | 3/2000 |
| JP | 4424590 B2 | 3/2010 |

(Continued)

*Primary Examiner* — Charlotte M Baker
(74) *Attorney, Agent, or Firm* — Novick, Kim & Lee, PLLC; Sang Ho Lee

(57) ABSTRACT

Provided are a method of judgment for in or out, and a recording medium and an apparatus for performing the same. The method performed by the apparatus for judging whether an object landed inside or outside of a line, includes: capturing a sport environment image provided with the line according to a preset rule, wherein the sport environment image includes an audio signal and an image signal; separating the audio signal and the image signal included in the sport environment image; detecting the line by analyzing the image signal; detecting a landing point-in-time of the object by analyzing each of the audio signal and the image signal; and judging whether the object landed inside or outside of the line by comparing the line with a location of the object at the landing point-in-time of the object.

11 Claims, 6 Drawing Sheets

(51) Int. Cl.
| | |
|---|---|
| *G10L 25/18* | (2013.01) |
| *G10L 25/30* | (2013.01) |
| *G06T 7/70* | (2017.01) |
| *G06T 7/20* | (2017.01) |
| *G06K 9/62* | (2006.01) |
| *G06T 7/194* | (2017.01) |

(52) U.S. Cl.
CPC .............. *G06T 7/20* (2013.01); *G06T 7/70* (2017.01); *G10L 25/18* (2013.01); *G10L 25/30* (2013.01); *G10L 25/51* (2013.01); *G06T 2207/30221* (2013.01)

(58) Field of Classification Search
CPC ......... G10L 25/51; G10L 25/18; G10L 25/30; G10L 25/57; G06T 7/70; G06T 7/20; G06T 7/194; G06T 2207/30221
USPC ........................... 382/103; 707/792, E17.055
See application file for complete search history.

(56) References Cited

FOREIGN PATENT DOCUMENTS

| | | |
|---|---|---|
| JP | 2016-168258 A | 9/2016 |
| KR | 10-2017-0027930 A | 3/2017 |
| KR | 10-2018-0022116 A | 3/2018 |
| KR | 10-2018-0086889 A | 8/2018 |
| KR | 10-1888748 B1 | 8/2018 |

\* cited by examiner

METHOD FOR JUDGING IN OR OUT, COMPUTER READABLE MEDIUM AND APPARATUS FOR PERFORMING THE METHOD

CROSS-REFERENCE TO RELATED APPLICATIONS

This application claims priority under 35 U.S.C. § 119 to Korean Patent Application No. 10-2019-0037742, filed on Apr. 1, 2019 and to Korean Patent Application No. 10-2019-0153281, filed on Nov. 26, 2019, in the Korean Intellectual Property Office, the disclosures of which are incorporated herein by reference in their entirety.

TECHNICAL FIELD

The present disclosure relates to a method of judgment for in or out and a recording medium and an apparatus for performing the same, and more particularly, to a method of judgment for in or out, for judging whether an object landed inside or outside of a line drawn on a sports field, and a recording medium and an apparatus for the performing the same.

BACKGROUND

Sports refer to various physical and mental activities, and take up a large amount of free time in daily life.

There are various types of sports, and among them, sports using balls are the most popular sports. In most sports, there are referees, and particularly in ball sports, there are various rules about relationships between balls and players, specified zones and lines.

Decisions using these rules are made by referees, and in most ball sports, balls move very fast, so in some instances, incorrect decisions are made due to momentary mistakes or limited physical capacity.

Recently, video replay provides a chance to reach a correct decision, and images of plays are used in the video replay.

Data for referee's decision-making is provided through video object tracking based on image information of plays, and to minimize occlusions occurred by players and referees, about ten ultrahigh-speed cameras are necessary. However, ultrahigh-speed cameras are priced very high, and with the increasing image information to be processed, the processing rate decreases and complexity increases.

SUMMARY

An aspect of the present disclosure provides a method of judgment for in or out, in which an audio signal is separated from an image of a play, and a positional relationship between a line and an object is judged using not only an image signal but also an audio signal, and a recording medium and an apparatus for performing the same.

The object of the present disclosure is not limited to the above-mentioned object, and other objects not mentioned herein will be clearly understood by those skilled in the art from the following description.

To achieve the above-described object, a method according to the present disclosure, performed by an apparatus of judgment for judging whether an object landed inside or outside of a line, includes: capturing a sport environment image provided with the line according to a preset rule, wherein the sport environment image includes an audio signal and an image signal; separating of the audio signal and the image signal included in the sport environment image; detecting the line by analyzing the image signal; detecting a landing point-in-time of the object by analyzing each of the audio signal and the image signal, wherein the audio signal is split into a plurality of frames with predetermined overlapping areas; and judging whether the object landed inside or outside of the line by comparing the line with a location of the object at the landing point-in-time of the object.

Meanwhile, the detecting the landing point-in-time of the object by analyzing each of the audio signal and the image signal may include extracting a spectrogram of the audio signal as a feature vector, and detecting the landing point-in-time of the object by inputting the feature vector to a deep learning neural network trained on features of the audio signal at the landing point-in-time of the object.

Additionally, the detecting the landing point-in-time of the object by analyzing each of the audio signal and the image signal may include separating the object from the image signal through foreground-background separation, applying a first Kalman filter and a second Kalman filter to a center point of the object to predict a falling movement of the object and a bouncing movement of the object, respectively, and detecting, as the landing point-in-time of the object, an intersection point between the center point of the object predicted by the first Kalman filter and the center point of the object predicted by the second Kalman filter.

Additionally, the detecting the line by analyzing the image signal may include detecting the line by applying a Hough Transform algorithm to the image signal.

Additionally, the detecting the landing point-in-time of the object by analyzing each of the audio signal and the image signal may include calculating a difference between the landing point-in-time of the object detected from the audio signal and a point-in-time immediately before or after the landing point-in-time of the object detected from the image signal, and generating a corrected landing point-in-time according to the calculated difference, when the landing point-in-time of the object is detected from both the audio signal and the image signal.

Additionally, there is provided a non-transitory computer-readable recording medium having recorded thereon a computer program for performing the method of judgment for in or out.

Meanwhile, an apparatus for judging whether an object landed inside or outside of a line according to the present disclosure includes a processor configured to: capture a sport environment image provided with the line according to a preset rule, wherein the sport environment image includes an audio signal and an image signal; separate the audio signal and the image signal included in the sport environment image; detect the line by analyzing the image signal; detect a landing point-in-time of the object by analyzing each of the audio signal and the image signal, wherein the audio signal is split into a plurality of frames with predetermined overlapping areas; and judge whether the object landed inside or outside of the line by comparing the line with a location of the object at the landing point-in-time of the object.

Meanwhile, the processor may be further configured to: extract a spectrogram of the audio signal as a feature vector; and detect the landing point-in-time of the object by inputting the feature vector to a deep learning neural network trained on features of the audio signal at the landing point-in-time of the object.

Additionally, the processor may be further configured to: separate the object from the image signal through foreground-background separation; apply a first Kalman filter and a second Kalman filter to a center point of the object to predict a falling movement of the object and a bouncing movement of the object, respectively; and detect, as the landing point-in-time of the object, an intersection point between the center point of the object predicted by the first Kalman filter and the center point of the object predicted by the second Kalman filter.

Additionally, the processor may be further configured to detect the line by applying a Hough Transform algorithm to the image signal.

Additionally, the processor may be further configured to calculate a difference between the landing point-in-time of the object detected from the audio signal and a point-in-time immediately before or after the landing point-in-time of the object detected from the image signal, and to generate a corrected landing point-in-time according to the calculated difference, when the landing point-in-time of the object is detected from both the audio signal and the image signal.

According to the present disclosure, it is possible to accurately judge a positional relationship between the line and the object under various conditions without requiring a high-priced device such as an ultrahigh-speed camera to minimize occlusions in the object.

DETAILED DESCRIPTION OF EMBODIMENTS

Figure 1:
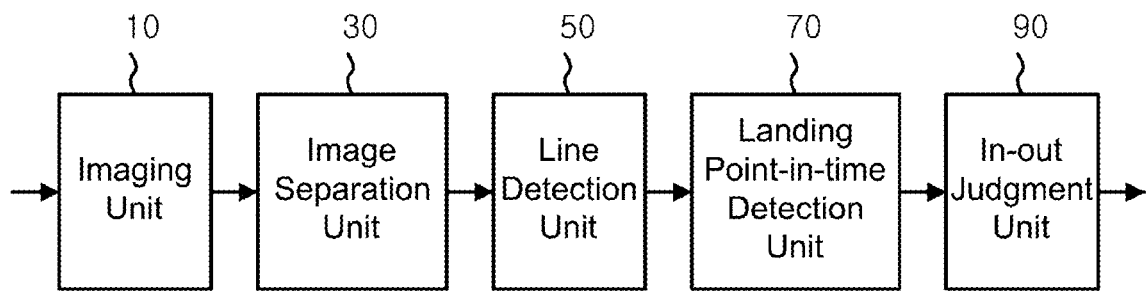
FIG. 1 is a block diagram of an apparatus of judgment for in or out according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment can be embodied in another embodiment without departing from the spirit and scope of the present disclosure. It should be further understood that changes can be made to positions or placements of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

The term "unit" is defined herein as having its broadest definition to an ordinary skill in the art to refer to a s chiding instructions executable in a non-transitory compute readable medium that would perform the associated function when executed, a circuit designed to perform the associated function, a hardware designed to perform the associated function, or a combination of a software, a circuit, or a hardware designed to perform the associated function.

Hereinafter, the preferred embodiments of the present disclosure will be described in more detail with reference to the accompanying drawings.

FIG. 1 is a block diagram of an apparatus of judgment for in or out according to an embodiment of the present disclosure.

Referring to FIG. 1, the apparatus 1 of judgment for in or out according to an embodiment of the present disclosure includes an imaging unit 10, an image separation unit 30, a line detection unit 50, a landing point-in-time detection unit 70 and an in-out judgment unit 90.

The apparatus 1 of judgment for in or out according to an embodiment of the present disclosure may be implemented by a larger or smaller number of elements than the elements shown in FIG. 1.

The apparatus 1 of judgment for in or out according to an embodiment of the present disclosure can communicate and input and output information and may be implemented as, for example, a smartphone, a tablet and a PC, and software (application) for in-out judgment according to an embodiment of the present disclosure may be installed and executed thereon.

The configuration of the imaging unit 10, the image separation unit 30, the line detection unit 50, the landing point-in-time detection unit 70 and the in-out judgment unit 90 shown in FIG. 1 may be controlled by the software running on the apparatus 1 of judgment for in or out according to an embodiment of the present disclosure.

In a sport environment provided with a line according to a preset rule, the apparatus 1 of judgment for in or out according to an embodiment of the present disclosure may judge whether an object landed inside or outside of the line. For example, the sport environment may correspond to a play that takes place on a field on which the line is drawn according to the preset rule, and the object may correspond to a ball used in ball sports.

The apparatus 1 of judgment for in or out according to an embodiment of the present disclosure may capture an image of the sport environment, separate the image into an audio signal and an image signal and judge whether the object landed inside or outside of the line by analysis. In the sport environment provided with the line such as ball sports, judging whether the object such as a ball landed inside or outside of the line is an important factor that could determine whether points are scored or not, and thus, accurate judgment is required. When a positional relationship between the line and the object is judged using the image signal alone, it is difficult to accurately judge in a situation in which the object is occluded. The apparatus 1 of judgment for in or out according to an embodiment of the present disclosure judges the positional relationship between the line and the object using not only the image signal but also the audio signal, and thus it is possible to accurately judge the positional relationship between the line and the object under various conditions.

Hereinafter, each element of the apparatus 1 of judgment for in or out according to an embodiment of the present disclosure as shown in FIG. 1 will be described in detail.

The imaging unit 10 may acquire a sport environment image. Hereinafter, the sport environment image is an image of a play that takes place on the field on which a line is drawn according to a preset rule, and is defined as an image including a line and an object to be judged. Additionally, the image is defined as a video including an image signal and an audio signal.

The imaging unit 10 may include at least one camera module to acquire the sport environment image.

For example, the imaging unit 10 may include at least one camera module fixed at an angle for capturing an image of at least part of the line drawn on the field.

The image separation unit 30 may separate each of the audio signal and the image signal included in the sport environment image.

As described above, the sport environment image may include the audio signal and the image signal. For example, the sport environment image may be compressed data by Moving Picture Expert Group (MPEG). In this case, the frequency of the audio signal may be approximately 48 kHz or 44.1 kHz. The image separation unit 30 may extract a raw Pulse Code Modulation (PCM) format from the sport environment image, and separate the extracted raw PCM format as the audio signal.

The line detection unit 50 may detect the line drawn on the field by analyzing the image signal, and extract it as a line to be judged.

The line detection unit 50 may detect the line from the image signal using the Hough Transform algorithm. The Hough Transform algorithm is widely used to find features such as a starlight line, a curve and a circle in the image signal, and detects a straight line using the polar coordinate system, rather than the rectangular coordinate system.

The landing point-in-time detection unit 70 may detect a landing point-in-time of the object by analyzing each of the image signal and the audio signal. It will be described in detail with reference to FIG. 2 below.

The in-out judgment unit 90 may judge whether the object landed inside or outside of the line by comparing the line with the location of the object at the landing point-in-time.

For example, the in-out judgment unit 90 may generate a boundary from the location of the object at the landing point-in-time detected by the landing point-in-time detection unit 70, and judge whether the object landed inside or outside of the line according to the number of intersection points between the boundary and the straight line detected by the line detection unit 50.

Meanwhile, the in-out judgment unit 90 may acquire the real coordinates that match the coordinates of the line in the sport environment image. Here, the real coordinates may be the coordinates in the real field. The in-out judgment unit 90 may calculate the real coordinates of the line detected by the line detection unit 50 based on a correlation between the preset coordinates in the sport environment image and the real coordinates or a coordinates table of the coordinates in the sport environment image and the real coordinates.

The in-out judgment unit 90 may acquire a frame at the landing point-in-time of the object in the sport environment image, and acquire the real coordinates that match the coordinates of the object in the frame at the landing point-in-time. The in-out judgment unit 90 may calculate the real coordinates of the object at the landing point-in-time detected by the landing point-in-time detection unit 70 based on the correlation between the preset coordinates in the sport environment image and the real coordinates or the coordinates table of the coordinates in the sport environment image and the real coordinates.

The in-out judgment unit 90 may judge whether the object landed inside or outside of the line by comparing the real coordinates of the line with the real coordinates of the object at the landing point-in-time.

Alternatively, the in-out judgment unit 90 may generate a judgment image including a frame at the landing point-in-time of the object, a frame before the landing point-in-time and a frame after the landing point-in-time in the sport environment image, and output the judgment image to receive an input about whether the object landed inside or outside of the line from a user. That is, the in-out judgment unit 90 may receive the input about whether the object landed inside or outside of the line as determined by the user with eyes, and judge whether the object landed inside or outside of the line.

Meanwhile, the landing point-in-time detection unit 70 may detect the landing point-in-time of the object by analyzing each of the image signal and the audio signal. That is, the landing point-in-time may be detected from the image signal, or may be detected from the audio signal. When both the landing point-in-time detected from the image signal and the landing point-in-time detected from the audio signal exist, the in-out judgment unit 90 may perform judgment processing as to whether the object landed inside or outside of the line on the basis of the landing point-in-time detected from the audio signal.

The in-out judgment unit 90 may output the judgment result of whether the object landed inside or outside of the line. When the in-out judgment unit 90 outputs the judgment result of whether the object landed inside or outside of the line, the in-out judgment unit 90 may output together the judgment image including the frame at the landing point-in-time of the object, the frame before the landing point-in-time and the frame after the landing point-in-time in the sport environment image.

Figure 2:
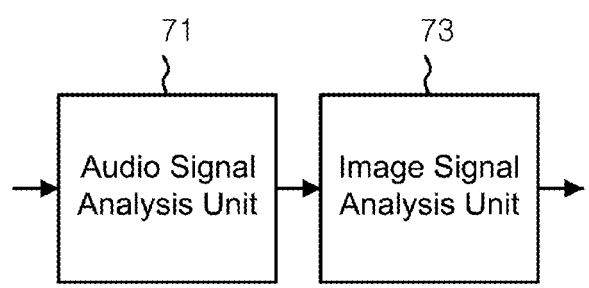
FIG. 2 is a detailed block diagram of a landing point-in-time detection unit shown in FIG. 1.

FIG. 2 is a detailed block diagram of the landing point-in-time detection unit shown in FIG. 1.

Referring to FIG. 2, the landing point-in-time detection unit 70 includes an audio signal analysis unit 71 and an image signal analysis unit 73.

The audio signal analysis unit 71 may detect the landing point-in-time of the object by analyzing the audio signal.

The audio signal analysis unit 71 may extract a spectrogram of the audio signal. The spectrogram shows how the spectrum density of frequencies of a signal varies with time, and may be represented by frequency as a function of time. For example, the audio signal analysis unit 71 may split the audio signal into a plurality of frames using a plurality of windows, and convert each split frame into the frequency domain using Fast Fourier Transform (FFT) to generate a frequency spectrum. The audio signal analysis unit 71 may extract the spectrogram by displaying the generated frequency spectrum using logarithmic scaling.

The audio signal analysis unit 71 may extract the spectrogram of the audio signal as a feature vector and apply the feature vector as an input parameter of a trained deep learning neural network.

In this embodiment, the deep learning neural network may be a Long Short Term Memory (LSTM) module. The LSTM can process time series data by reflecting a signal of a previous frame on a current frame, and stores previous information (for example, data associated with the audio signal) in a memory cell and adjusts an amount of information flowing to the memory cell through gates. In this embodiment, the LSTM module is a deep learning neural network trained on the features of the audio signal at the landing point-in-time of the object, e.g., identify and/or match the features, and may be configured to predict the landing point-in-time of the object in the audio signal.

The audio signal analysis unit 71 may detect the landing point-in-time of the object from the audio signal by inputting the feature vector of the audio signal to the deep learning neural network.

The image signal analysis unit 73 may detect the landing point-in-time of the object by analyzing the image signal.

The image signal analysis unit 73 may separate the object by performing a predetermined pre-processing step on the image signal, and then foreground-background separation. To this end, the image signal analysis unit 73 may pre-store background information.

The image signal analysis unit 73 may predict and detect the landing point-in-time of the object by applying the Kalman filter to the center point of the object separated from the image signal.

The Kalman filter is widely used for object tracking in the image processing, and it is an optimal estimator for finding state variables of a target system using a probabilistic model and measurements of the system. The object tracking method using the Kalman filter is performed by prediction and update, and for example, a linear motion may be predicted using the coordinates of the center point of the object as the measurements.

The image signal analysis unit 73 may use a first Kalman filter to predict a falling movement of the object, and a second Kalman filter to predict a movement of the object bouncing back from the ground.

The image signal analysis unit 73 may detect, as the landing point-in-time of the object, an intersection point between the center point of the object predicted by applying the first Kalman filter to the center point of the object and the center point of the object predicted by applying the second Kalman filter.

As described above, the apparatus 1 of judgment for in or out according to an embodiment of the present disclosure may judge whether the object landed inside or outside of the line by detecting the landing point-in-time of the object using not only the image signal but also the audio signal. The landing point-in-time of the object has been detected in reliance on the image signal, but to minimize occlusions in the object, a high-priced device such as an ultrahigh-speed camera is required and processing complexity increases. However, the apparatus 1 of judgment for in or out according to an embodiment of the present disclosure may detect the landing point-in-time of the object from not only the image signal but also the audio signal, and thus it is possible to accurately judge the positional relationship between the line and the object using even a general camera.

Figure 3:
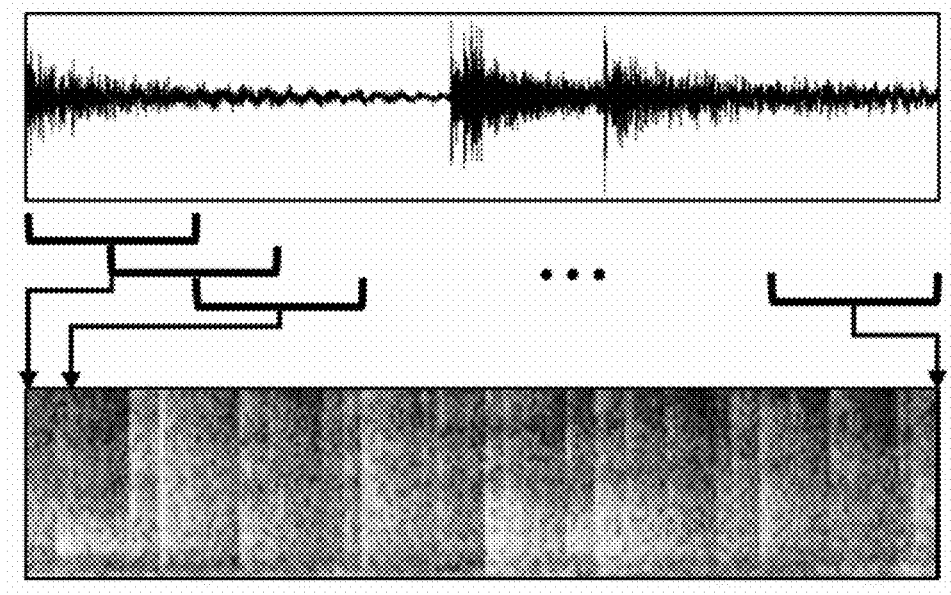
FIG. 3 is a schematic diagram showing a process in which an audio signal analysis unit of FIG. 2 generates a spectrogram.

FIG. 3 is a schematic diagram showing a process in which the audio signal analysis unit of FIG. 2 generates a spectrogram.

The audio signal analysis unit 71 may extract a spectrogram of the audio signal. The spectrogram shows how spectrum density of frequencies of a signal varies with time, and may be represented by frequency as a function of time. For example, the audio signal analysis unit 71 may split the audio signal into a plurality of frames using a plurality of windows, and convert each split frame into the frequency domain using FFT to generate a frequency spectrum. The audio signal analysis unit 71 may extract the spectrogram by displaying the generated frequency spectrum using logarithmic scaling.

Here, the audio signal analysis unit 71 may split the audio signal into the plurality of frames such that predetermined areas displayed by each window overlap.

Referring to FIG. 3, it can be seen that each window used to analyze the audio signal overlaps by as much as 50%.

In this instance, the number of windows used to analyze the audio signal may be differently determined depending on the size of each window, and to this end, the size of the plurality of windows used for the audio signal analysis unit 71 to analyze the audio signal may be arbitrarily set.

Accordingly, the audio signal analysis unit 71 may convert each frame split by the plurality of windows into the frequency domain using FFT to generate a frequency spectrum, and the audio signal analysis unit 71 may extract the spectrogram by displaying the generated frequency spectrum using logarithmic scaling.

Meanwhile, the audio signal analysis unit 71 may extract the spectrogram of the audio signal as a feature vector and apply the feature vector as an input parameter of the trained deep learning neural network.

In relation to this, the audio signal analysis unit 71 may quantize the spectrogram of the audio signal, and accordingly, the audio signal analysis unit 71 may extract the spectrogram of the audio signal as the same number of feature vectors as the preset number of quantization levels.

For example, the audio signal analysis unit 71 may apply 40 levels of quantization to the spectrogram of the audio signal, and in this case, the audio signal analysis unit 71 may extract 40 feature vectors from the spectrogram of the audio signal.

Meanwhile, the feature vector may differ in each of the plurality of frames split from the audio signal, and for example, it may be understood that when the audio signal is split into 132 frames, the feature vector is present on 40 levels in each of the 132 frames.

Figure 4:
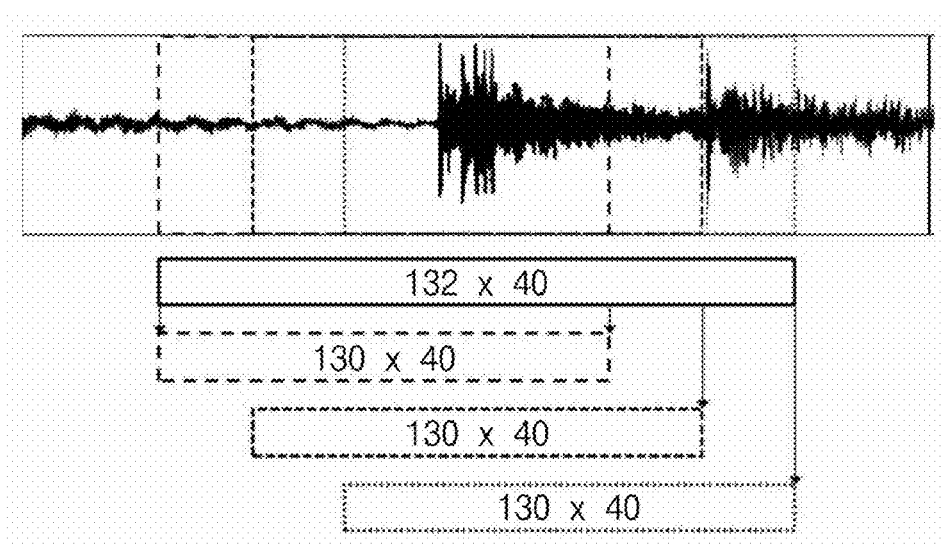
FIG. 4 is a schematic diagram showing a process in which an audio signal analysis unit of FIG. 2 trains a deep learning neural network.

FIG. 4 is a schematic diagram showing a process in which the audio signal analysis unit of FIG. 2 trains the deep learning neural network.

In this embodiment, the deep learning neural network may be a LSTM module. The LSTM can process time series data by reflecting a signal of a previous frame on a current frame, and stores previous information (for example, data associated with the audio signal) in a memory cell and adjusts the amount of information flowing to the memory cell through gates. In this embodiment, the LSTM module is a deep learning neural network trained on the features of the audio signal at the landing point-in-time of the object, and may be configured to predict the landing point-in-time of the object in the audio signal.

In this instance, the deep learning neural network may be trained on some consecutive frames among the plurality of frames split from the audio signal, for feature vector representation.

In relation to this, the deep learning neural network may be trained on at least one of the plurality of frames, and in this instance, some frames extracted from the plurality of frames may include some frames including a time-sequentially first frame and some frames including a time-sequentially last frame among the plurality of frames split from the audio signal.

Referring to FIG. 4, it may be understood that 132 frames are extracted from the audio signal, and each frame includes a feature vector on 40 levels.

Accordingly, the deep learning neural network may be understood as being trained three times on some frames including 130 frames among the 132 frames, and each of some frames may be understood as including 1-130 frames, 2-131 frames and 3-132 frames.

Meanwhile, the audio signal analysis unit 71 may detect the landing point-in-time of the object from the audio signal by inputting the feature vector of the audio signal to the deep learning neural network.

In this instance, the audio signal analysis unit 71 may extract the plurality of frames extracted from the audio signal at time-sequentially moved locations, and accordingly, the audio signal analysis unit 71 may extract the feature vectors from the plurality of different frames, and input the feature vectors of the plurality of different frames from which the feature vectors have been extracted to the deep learning neural network.

Accordingly, the audio signal analysis unit 71 may detect a recognition rate of the deep learning neural network for the feature vectors of the plurality of different frames, the audio signal analysis unit 71 may detect a feature vector detected with the highest recognition rate from the feature vectors of the plurality of time-sequentially different frames, and the audio signal analysis unit 71 may detect a point in time indicated by the corresponding feature vector as the landing point-in-time.

Figure 5:
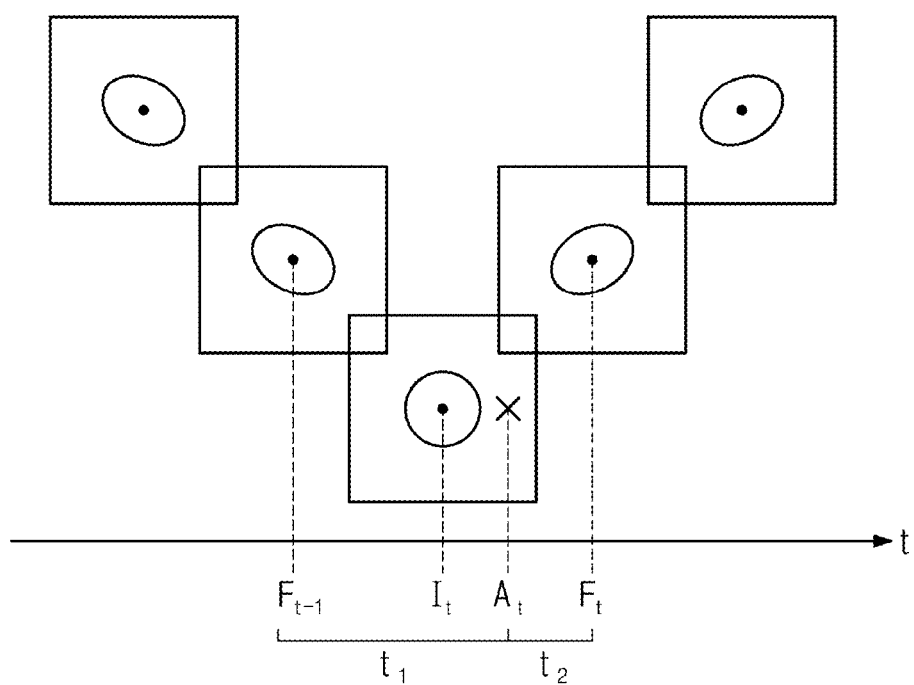
FIG. 5 is a schematic diagram showing an embodiment in which a landing point-in-time detection unit of FIG. 1 detects a landing point-in-time.

FIG. 5 is a schematic diagram showing an embodiment in which the landing point-in-time detection unit of FIG. 1 detects the landing point-in-time.

The landing point-in-time detection unit 70 may correct the landing point-in-time by comparing the landing point-in-time detected by the audio signal analysis unit 71 with frames immediately before and after the landing point-in-time detected by the image signal analysis unit 73.

Referring to FIG. 5, shown are the landing point-in-time A_t detected by the audio signal analysis unit 71, and a preceding point-in-time F_t-1 representing the point in time of the frame immediately before the landing point-in-time I_t detected by the image signal analysis unit 73 and a subsequent point-in-time F_t representing the point in time of the frame immediately after the landing point-in-time.

Accordingly, the landing point-in-time detection unit 70 may generate a first time variable by calculating a difference between the landing point-in-time A_t detected by the audio signal analysis unit 71 and the preceding point-in-time F_t-1 present immediately before the landing point-in-time I_t detected by the image signal analysis unit 73, and the landing point-in-time detection unit 70 may generate a second time variable by calculating a difference between the subsequent point-in-time F_t present immediately after the landing point-in-time I_t detected by the image signal analysis unit 73 and the landing point-in-time A_t detected by the audio signal analysis unit 71.

Additionally, the landing point-in-time detection unit 70 may set the first time variable to the first Kalman filter as a time interval between frames according to the image signal, and the landing point-in-time detection unit 70 may set the second time variable to the second Kalman filter as a time interval between frames according to the image signal.

Accordingly, the apparatus 1 of judgment for in or out according to an embodiment of the present disclosure may detect the corrected landing point-in-time of the object from the image signal and the audio signal, and thus it is possible to accurately judge the positional relationship between the line and the object using even a general camera.

Hereinafter, a method of judgment for in or out according to an embodiment of the present disclosure will be described with reference to FIG. 6.

Figure 6:
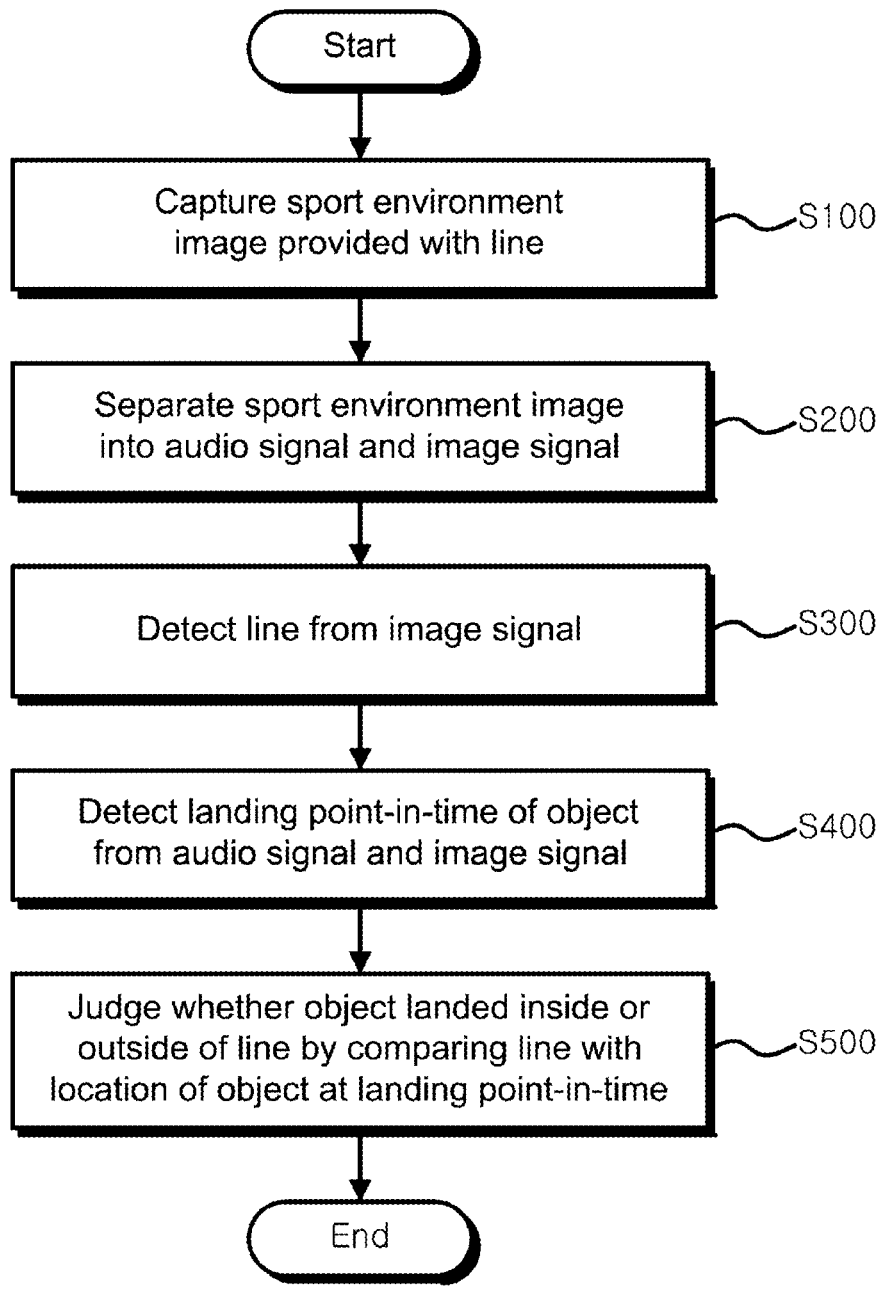
FIGS. 6 to 8 are flowcharts of a method of judgment for in or out according to an embodiment of the present disclosure.
Figure 7:
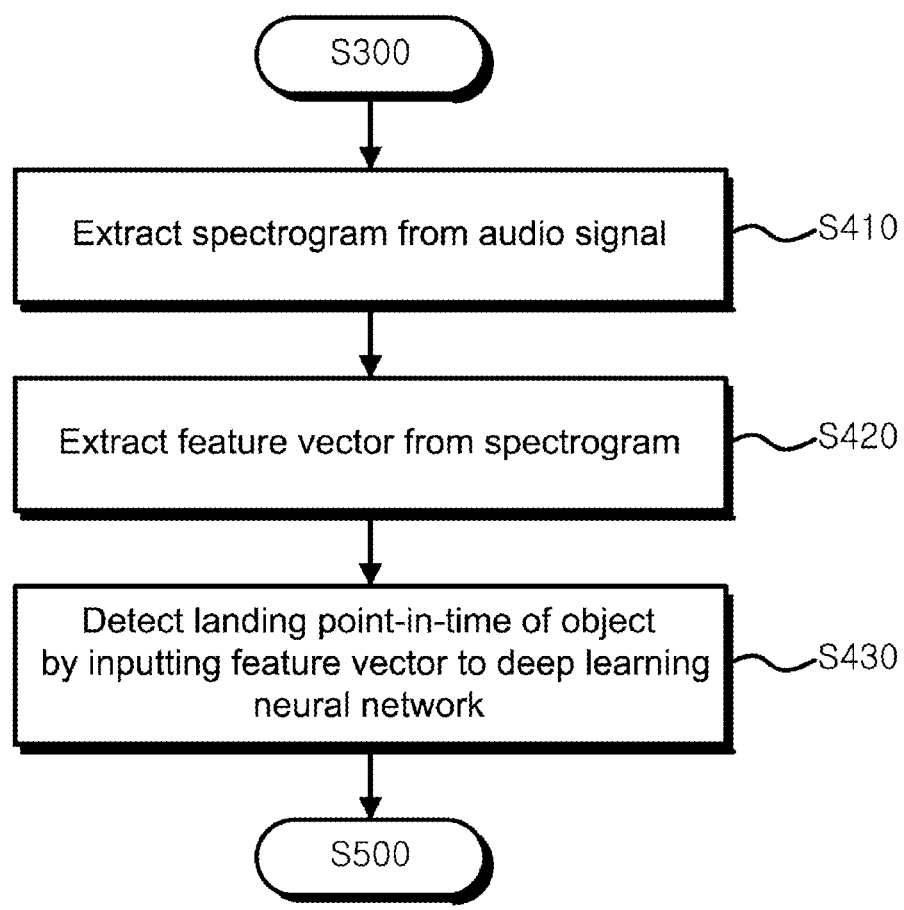
Figure 8:
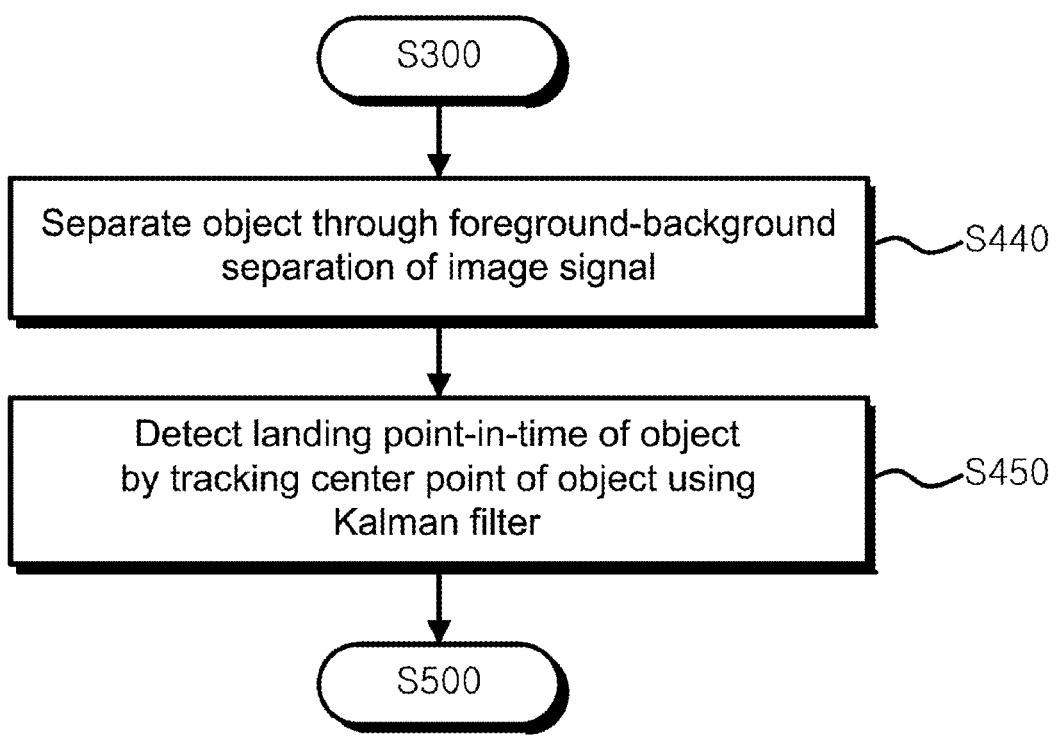

FIGS. 6 to 8 are flowcharts of the method of judgment for in or out according to an embodiment of the present disclosure.

The method of judgment for in or out according to an embodiment of the present disclosure may be performed in substantially the same configuration as the apparatus 1 of judgment for in or out according to an embodiment of the present disclosure as shown in FIG. 1. Accordingly, the same elements as those of the apparatus 1 of judgment for in or out shown in FIG. 1 are given the same reference numerals, and redundant descriptions are omitted herein.

Referring to FIG. 6, the imaging unit 10 may capture a sport environment image provided with a line (S100).

The imaging unit 10 may include at least one camera module to acquire the sport environment image. For example, the imaging unit 10 may include at least one camera module fixed at an angle for capturing an image of at least part of the line drawn on the field.

The image separation unit 30 may separate the sport environment image into an audio signal and an image signal (S200).

The sport environment image may include the audio signal and the image signal. The image separation unit 30 may extract a raw PCM format from the sport environment image, and separate the extracted raw PCM format as the audio signal.

The line detection unit 50 may detect the line from the image signal (S300).

The line detection unit 50 may detect the line drawn on the field by analyzing the image signal, and extract it as a line to be judged. The line detection unit 50 may detect the line from the image signal using the Hough Transform algorithm. The Hough Transform algorithm is widely used to find features such as a straight line, a curve and a circle in the image signal, and detects a straight line using the polar coordinate system, rather than the rectangular coordinate system.

The landing point-in-time detection unit 70 may detect a landing point-in-time of the object from the audio signal and the image signal (S400). It will be described in detail with reference to FIGS. 7 and 8 below.

The landing point-in-time detection unit 70 may detect the landing point-in-time of the object by analyzing each of the image signal and the audio signal (S400).

The landing point-in-time detection unit 70 may detect the landing point-in-time of the object from either the image signal or the audio signal or both according to the state of the sport environment image. A detailed description is provided with reference to FIG. 2.

The in-out judgment unit 90 may judge whether the object landed inside or outside of the line by comparing the line with the location of the object at the landing point-in-time (S500).

The in-out judgment unit 90 may acquire the real coordinates that match the coordinates of the line in the sport environment image. The in-out judgment unit 90 may acquire a frame at the landing point-in-time of the object in the sport environment image, and acquire the real coordinates that match the coordinates of the object in the frame at the landing point-in-time. The in-out judgment unit 90 may judge whether the object landed inside or outside of the line by comparing the real coordinates of the line with the real coordinates of the object at the landing point-in-time.

Here, when both the landing point-in-time detected from the image signal and the landing point-in-time detected from the audio signal exist, the in-out judgment unit 90 may perform judgment processing as to whether the object landed inside or outside of the line on the basis of the landing point-in-time detected from the audio signal.

The in-out judgment unit 90 may output the judgment result of whether the object landed inside or outside of the line. When the in-out judgment unit 90 outputs the judgment result of whether the object landed inside or outside of the line, the in-out judgment unit 90 may output together a judgment image including the frame at the landing point-in-time of the object, a frame before the landing point-in-time and a frame after the landing point-in-time in the sport environment image.

Referring to FIG. 7, the landing point-in-time detection unit 70 may extract a spectrogram from the audio signal (S410), and extract the spectrogram of the audio signal as a feature vector (S420).

The landing point-in-time detection unit 70 may split the audio signal into a plurality of frames using a plurality of windows, and convert each split frame into the frequency domain using FFT to generate a frequency spectrum. The landing point-in-time detection unit 70 may extract the spectrogram by displaying the generated frequency spectrum using logarithmic scaling.

The landing point-in-time detection unit 70 may detect the landing point-in-time of the object by inputting the feature vector to the deep learning neural network (S430).

In this embodiment, the deep learning neural network is a deep learning neural network configured to predict the landing point-in-time of the object in the audio signal, and may be a LSTM module trained on the features of the audio signal at the landing point-in-time of the object.

The landing point-in-time detection unit 70 may detect the landing point-in-time by applying the feature vector as an input parameter of the trained deep learning neural network.

Alternatively, referring to FIG. 8, the landing point-in-time detection unit 70 may separate the object through foreground-background separation of the image signal (S440).

The landing point-in-time detection unit 70 may separate the object by performing a predetermined pre-processing step on the image signal, and then foreground-background separation.

The landing point-in-time detection unit 70 may detect the landing point-in-time of the object by tracking the center point of the object separated from the image signal using the Kalman filter (S450).

The landing point-in-time detection unit 70 may use the first Kalman filter to predict a falling movement of the object, and the second Kalman filter to predict a movement of the object bouncing back from the ground.

The landing point-in-time detection unit 70 may detect, as the landing point-in-time of the object, an intersection point between the center point of the object predicted by applying the first Kalman filter to the center point of the object and the center point of the object predicted by applying the second Kalman filter.

The method of judgment for in or out according to the present disclosure may be implemented as an application or in the form of program commands that may be executed through various computer components and may be recorded in computer-readable recording media. The computer-readable recording media may include program commands, data files and data structures, alone or in combination.

The program commands recorded in the computer-readable recording media may be specially designed and configured for the present disclosure, and may be those known and available to those having ordinary skill in the field of computer software.

The computer-readable recording media may be non-transitory computer-readable recording media. Examples of the computer-readable recording media include hardware devices specially designed to store and execute program commands, for example, magnetic media such as hard disk, floppy disk and magnetic tape, optical media such as CD-ROM and DVD, magneto-optical media such as floptical disk, and ROM, RAM and flash memory.

Examples of the program command include machine code generated by a compiler as well as high-level language code that can be executed by a computer using an interpreter. The hardware device may be configured to act as one or more software modules to perform the processing according to the present disclosure, or vice versa.

While the present disclosure has been hereinabove described with reference to the embodiments, it will be appreciated by those having ordinary skill in the technical field pertaining to the present disclosure that various modifications and changes may be made thereto without departing from the spirit and scope of the present disclosure defined in the appended claims.

What is claimed is:

1. A method performed by an apparatus of judgment for judging whether an object landed inside or outside of a line, the method comprising:
   capturing a sport environment image provided with the line according to a preset rule, wherein the sport environment image includes an audio signal and an image signal;
   separating of the audio signal and the image signal included in the sport environment image;
   detecting the line by analyzing the image signal;
   detecting a landing point-in-time of the object by analyzing each of the audio signal and the image signal, wherein the audio signal is split into a plurality of frames with predetermined overlapping areas; and
   judging whether the object landed inside or outside of the line by comparing the line with a location of the object at the landing point-in-time of the object.

2. The method of claim 1, wherein the detecting the landing point-in-time of the object by analyzing each of the audio signal and the image signal comprises:
   extracting a spectrogram of the audio signal as a feature vector; and
   detecting the landing point-in-time of the object by inputting the feature vector to a deep learning neural network trained on features of the audio signal at the landing point-in-time of the object.

3. The method of claim 1, wherein the detecting the landing point-in-time of the object by analyzing each of the audio signal and the image signal comprises:
   separating the object from the image signal through foreground-background separation;
   applying a first Kalman filter and a second Kalman filter to a center point of the object to predict a falling movement of the object and a bouncing movement of the object, respectively; and
   detecting, as the landing point-in-time of the object, an intersection point between the center point of the object predicted by the first Kalman filter and the center point of the object predicted by the second Kalman filter.

4. The method of claim 1, wherein the detecting the line by analyzing the image signal comprises:
   detecting the line by applying a Hough Transform algorithm to the image signal.

5. The method of claim 1, wherein the detecting the landing point-in-time of the object by analyzing each of the audio signal and the image signal comprises:

calculating a difference between the landing point-in-time of the object detected from the audio signal and a point-in-time immediately before or after the landing point-in-time of the object detected from the image signal, and generating a corrected landing point-in-time according to the calculated difference, when the landing point-in-time of the object is detected from both the audio signal and the image signal.

6. A non-transitory computer-readable recording medium having recorded thereon a computer program for performing the method of claim 1.

7. An apparatus for judging whether an object landed inside or outside of a line, the apparatus comprising a processor configured to:

capture a sport environment image provided with the line according to a preset rule, wherein the sport environment image includes an audio signal and an image signal;

separate the audio signal and the image signal included in the sport environment image;

detect the line by analyzing the image signal;

detect a landing point-in-time of the object by analyzing each of the audio signal and the image signal, wherein the audio signal is split into a plurality of frames with predetermined overlapping areas; and judge whether the object landed inside or outside of the line by comparing the line with a location of the object at the landing point-in-time of the object.

8. The apparatus of claim 7, wherein the processor is further configured to:

extract a spectrogram of the audio signal as a feature vector; and detect the landing point-in-time of the object by inputting the feature vector to a deep learning neural network trained on features of the audio signal at the landing point-in-time of the object.

9. The apparatus of claim 7, wherein the processor is further configured to:

separate the object from the image signal through foreground-background separation;

apply a first Kalman filter and a second Kalman filter to a center point of the object to predict a falling movement of the object and a bouncing movement of the object, respectively; and detect, as the landing point-in-time of the object, an intersection point between the center point of the object predicted by the first Kalman filter and the center point of the object predicted by the second Kalman filter.

10. The apparatus of claim 7, wherein the processor is further configured to detect the line by applying a Hough Transform algorithm to the image signal.

11. The apparatus of claim 7, wherein the processor is further configured to calculate a difference between the landing point-in-time of the object detected from the audio signal and a point-in-time immediately before or after the landing point-in-time of the object detected from the image signal, and to generate a corrected landing point-in-time according to the calculated difference, when the landing point-in-time of the object is detected from both the audio signal and the image signal.

* * * * *